United States Patent [19]

Brinati et al.

[11] Patent Number: 5,175,223
[45] Date of Patent: Dec. 29, 1992

[54] NEW FLUOROELASTOMERS BASED ON VINYLIDENE FLUORIDE, HEXAFLUOROPROPENE AND TETRAFLUOROETHYLENE

[75] Inventors: Giulio Brinati; Margherita Albano, both of Milan; Vincenzo Arcella, Novara, all of Italy

[73] Assignee: Ausimont S.p.A., Italy

[21] Appl. No.: 665,851

[22] Filed: Mar. 7, 1991

[30] Foreign Application Priority Data

Mar. 9, 1990 [IT] Italy .................. 41003 A/90

[51] Int. Cl.$^5$ .................................................. C08F 14/22
[52] U.S. Cl. .................................. 526/254; 526/255
[58] Field of Search .................................... 526/254

[56] References Cited

U.S. PATENT DOCUMENTS

| | | | |
|---|---|---|---|
| 2,968,649 | 1/1961 | Pailthorp et al. | 526/254 |
| 3,790,540 | 2/1974 | Dohany et al. | 526/254 |
| 3,845,024 | 10/1974 | Weaver | 526/254 |
| 4,123,603 | 10/1978 | Stewart, Jr. | |
| 4,690,994 | 9/1987 | Masuda et al. | 526/254 |
| 4,985,520 | 1/1991 | Hayashi et al. | 526/254 |

FOREIGN PATENT DOCUMENTS

| | | | |
|---|---|---|---|
| 772162 | 1/1972 | Belgium | 526/254 |
| 0186180 | 7/1986 | European Pat. Off. | 526/254 |
| 0197562 | 10/1986 | European Pat. Off. | 526/254 |
| 2358270 | 5/1974 | Fed. Rep. of Germany | 526/254 |
| 62-112611 | 5/1987 | Japan | 526/254 |

Primary Examiner—Joseph L. Schofer
Assistant Examiner—N. Sarofin
Attorney, Agent, or Firm—Morgan & Finnegan

[57] ABSTRACT

The invention relates to new fluoroelastomers endowed with a low Tg and a low compression set at low temperature, characterized by the following monomeric composition:

| | |
|---|---|
| vinylidene fluoride: | 60.5–64% by weight |
| hexafluoropropene: | 30–33% by weight |
| tetrafluoroethylene: | 5–8% by weight. |

2 Claims, No Drawings

NEW FLUOROELASTOMERS BASED ON VINYLIDENE FLUORIDE, HEXAFLUOROPROPENE AND TETRAFLUOROETHYLENE

FIELD OF THE INVENTION

The present invention relates to new fluoroelastomers based on terpolymers of vinylidene fluoride, hexafluoropropene and tetrafluoroethylene.

U.S. Pat. No. 4,123,603 discloses elastomeric terpolymers having the following monomeric composition:

| | |
|---|---|
| vinylidene fluoride: | 57-61% by weight |
| hexafluoropropene: | 27-31% by weight |
| tetrafluoroethylene: | 10-14% by weight |

These terpolymers are endowed with a low glass transition temperature (Tg) and a low compression set at low temperature.

The preferred product of the abovesaid patent has the following monomeric composition in % by weight: 59% of vinylidene fluoride, 29% of hexafluoropropene and 12% of tetrafluoroethylene. The Tg average of four samples of this product is of 24.75° C. The compression set of the abovesaid samples, after a 70-hour compression test at 0° C. (according to ASTM-D 395 test, method B) is lower than or equal to 20%, when it is measured at room temperature within one hour after conclusion of the test.

This patent states and proves by means of several comparison examples that, out of the field of the described compositions, it is not possible to obtain, at the same time, a low Tg and a low compression set at low temperature.

DESCRIPTION OF THE INVENTION

It has now surprisingly been found that there is another terpolymer composition field in which said two properties are simultaneously obtained.

Thus, it is an object of the present invention to provide new fluoroelastomers based on vinylidene fluoride, hexafluoropropene and tetrafluoroethylene terpolymers, which are simultaneously endowed with a low Tg and a low compression set at low temperature.

Another object is to provide fluoroelastomers of the abovesaid type, which exhibit also a very low crystallinity, lower than the one of the abovesaid known product, and low TR (temperature retraction) values.

A further object is to provide fluoroelastomers of the abovesaid type, which exhibit furthermore a higher vulcanization rate than the one of the abovesaid known product.

These and still other objects are achieved by the fluoroelastomers according to the present invention, which are characterized by the following monomeric composition:

| | |
|---|---|
| vinylidene fluoride: | 60.5-64% by weight |
| hexafluoropropene: | 30-33% by weight |
| tetrafluoroethylene: | 5-8% by weight. |

These fluoroelastomers are endowed with a glass transition temperature (Tg) which is lower than or equal to about $-25°$ C. and with a compression set, after a 70-hour compression test at 0° C. on a disc (according to ASTM D 395 test, method B), lower than or equal to about 18%, when measured at 23° C. after 30 minutes.

Furthermore, they are endowed with a low crystallinity and low TR values. In addition they exhibit, as compared with the abovesaid terpolymer of the art, a higher vulcanization rate, which results in a higher productivity of the apparatus for the production of shaped articles.

They are particularly suitable for those appliances, for which a low Tg and a low compression set at low temperature are required in particular for the manufacture of O-rings and shaft seals.

In these appliances, a lowering of the Tg and mainly of the TR values without compromising the compression set values is a need particularly felt by users, for whom a gain of a few centigrade degrees represents a weighty technological progress.

The terpolymers according to the present invention may be prepared by means of known methods such as, for example, the ones described in Kirk Othmer, Encyclopaedia of Chemical Technology, vol. 8, pages 500 and follow., 1979. As polymerization methods it is possible to use, in particular, the bulk polymerization, the polymerization in a solution of organic solvents and the polymerization in a water emulsion or suspension. As radical polymerization starters it is possible to use, for example, inorganic peroxides, such as ammonium or potassium persulphates, redox systems such as persulphate-bisulphite and organic peroxides such as, for example, benzoyl peroxide and dicumyl peroxide.

As chain transfer agents it is possible to use, for example, ethyl acetate and diethyl malonate.

Preferably it is operated in an aqueous emulsion, at temperatures ranging from 25° to 150° C. and under pressures ranging from 8 to 80 atmospheres.

Another object of the present invention is also represented by the articles manufactured starting from the terpolymers according to the invention.

EXAMPLES

The following examples are merely illustrative and cannot be construed as being a limitation of the scope of the present invention.

In the considered examples, examples 1 and 2 are within the composition range of the present invention, while example 3 regards the preferred composition of the above-cited U.S. Pat. No. 4,123,603.

The preparation of the polymers by means of the emulsion polymerization process was carried out in such manner as to maintain, for all the elastomers of the considered examples, the same average molecular weight (obtained from the Mooney viscosity ML (1+10) at 121° C. and from the intrinsic viscosity) and the same molecular weight distribution.

Therefore, the chemico-physical properties indicated in Table 1 depend exclusively on the monomeric composition of the polymers.

EXAMPLE 1

Use was made of a 10-liter reactor equipped with a stirrer. After vacuum had been created, 6,500 g of water were fed and pressure was generated in the reactor by means of a monomeric mixture having the following molar composition:

| | |
|---|---|
| vinylidene fluoride: | 58% |

-continued

|                      |     |
| -------------------- | --- |
| hexafluoropropene:   | 38% |
| tetrafluoroethylene: | 4%  |

The reactor was brought up to 85° C.; the pressure reached 19 bar. There were added:
260 ml of ethyl acetate as an aqueous solution at 66 ml/l;
13 g of ammonium persulphate as an aqueous solution at 150 g/l.

During polymerization, the pressure was maintained constant by feeding the monomers in the following molar ratios:

|                      |       |
| -------------------- | ----- |
| vinylidene fluoride: | 78.5% |
| hexafluoropropene:   | 16.5% |
| tetrafluoroethylene: | 5%    |

After reaching such a conversion that 2,800 g of polymer were obtained, with a polymerization time of 55 minutes, the whole was cooled to room temperature. The emulsion was discharged and then coagulated by addition of an aluminum sulphate water solution. The polymer was separated, washed with water and dried in an air-circulation oven at 60° C. till reaching a humidity degree in the polymer below 0.2% by weight. On NMR$^{19}$F analysis, the polymer exhibited the following monomeric composition:

|                      |                |
| -------------------- | -------------- |
| vinylidene fluoride: | 63% by weight  |
| hexafluoropropene:   | 30.6% by weight |
| tetrafluoroethylene: | 6.4% by weight |

The polymer was subjected to several determinations and tests, which are reported in Table 1.

The vulcanization blend was prepared by using a master M1 containing 50% of bisphenol AF and 50% of fluoroelastomer and a master M2 containing 30% of an accelerator and 70% of fluoroelastomer. The accelerator had the formula:

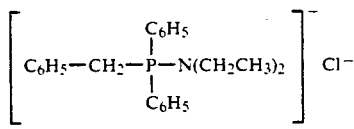

The blend contained:

|             |                    |
| ----------- | ------------------ |
| terpolymer: | 100 parts by weight |
| master M1   | 4 parts by weight   |
| master M2   | 1.5 parts by weight |
| Ca(OH)$_2$  | 6 parts by weight   |
| MgO         | 3 parts by weight   |
| MT black    | 25 parts by weight  |

EXAMPLE 2

It was operated as in example 1, except that the reactor was brought to pressure by means of the following monomeric mixture:

|                      |          |
| -------------------- | -------- |
| vinilydene fluoride: | 59% by mols |
| hexafluoropropene:   | 36% by mols |
| tetrafluoroethylene: | 5% by mols  | and except that, during polymerization, the pressure was maintained constant by feeding the monomers in the following molar ratios:

|                      |       |
| -------------------- | ----- |
| vinylidene fluoride: | 77.2% |
| hexafluoropropene:   | 16.5% |
| tetrafluoroethylene: | 6.3%  |

There were obtained 2,800 g of a terpolymer which, on NMR$^{19}$F analysis, exhibited the following monomeric weight composition:

|                      |       |
| -------------------- | ----- |
| vinylidene fluoride: | 61.4% |
| hexafluoropropene:   | 30.8% |
| tetrafluoroethylene: | 7.8%  |

The terpolymer was subjected to the same determinations and tests as the one of example 1. The results are reported in Table 1.

EXAMPLE 3

For comparison purposes, the preferred terpolymer of U.S. Pat. No. 4,123,603 was prepared. The modalities were identical with those of example 1, with the exception that:

1. the reactor was brought to pressure by means of the following molar composition:

|                      |     |
| -------------------- | --- |
| vinylidene fluoride: | 56% |
| hexafluoropropene:   | 36% |
| tetrafluoroethylene: | 8%  |

2. during polymerization, the pressure was maintained constant by feeding the monomers in the following molar ratios:

|                      |       |
| -------------------- | ----- |
| vinylidene fluoride: | 74.7% |
| hexafluoropropene:   | 15.6% |
| tetrafluoroethylene: | 9.7%  |

There were obtained 2,800 g of a terpolymer which, on NMR$^{19}$F analysis, exhibited the following monomeric weight composition:

|                      |       |
| -------------------- | ----- |
| vinylidene fluoride: | 59.5% |
| hexafluoropropene:   | 28.6% |
| tetrafluoroethylene: | 11.9% |

TABLE 1

| Nature of the test | Ex. 1 | Ex. 2 | Ex. 3 |
| --- | --- | --- | --- |
| A - DETERMINATIONS ON THE ELASTOMER: | | | |
| Tg midpoint (ASTM D 3418-82) | −26° C. | −25.2° C. | −25.4° C. |
| Tf1 (ASTM D 3418-82) | 51.3° C. | 42.7° C. | 44.9° C. |
| Tf2 | 72° C. | 58° C. | 63.7° C. |
| DH1 | 0.03 | 0.11 | 0.10 |
| DH2 | 0.08 | 0.02 | 0.12 |
| DH1 + DH2 | 0.11 | 0.13 | 0.22 |
| DMS (METHOD ISO R 537B) | | | |
| T α | −19° C. | −19° C. | −18° C. |
| G' (10° C.) | 1.2 N/mm | 1.1 N/mm | 1.35 N/mm |

TABLE 1-continued

| Nature of the test | Ex. 1 | Ex. 2 | Ex. 3 |
|---|---|---|---|
| Intrinsic viscosity (ASTM D 1416-83) | 59 ml/g | 60 ml/g | 58 ml/g |
| Mw/Mn (ASTM D 3593-80) | 2.6 | 2.5 | 2.4 |
| Mooney viscosity ML (1 + 10') at 121° C. (Mooney unit) (ASTM D 1646-82) | 19 | 20 | 20 |
| B - TESTS ON THE VULCANIZATION MIX: | | | |
| Mooney viscosity of the mix (ASTM D 1646-82) ML (1 + 10') at 121° C. (Mooney unit) | 36 | 37 | 37 |
| Mooney scorch at 135° C. (ASTM D 1646-82) | | | |
| MV (pounds × inch) | 12 | 14 | 14 |
| t Δ 15 | 46'30" | 47'30" | 45'45" |
| ODR 177° C., ARC ±3° (ASTM D 2084-81) | | | |
| ML (pounds × inch) | 3.4 | 3.5 | 3.5 |
| MH (pounds × inch) | 96.5 | 100 | 99.5 |
| ts2 (sec) | 171 | 170 | 177 |
| t'90 (sec) | 243 | 235 | 267 |
| $V_{max}$ (pounds × inch/sec) | 3 | 3.2 | 2.7 |
| C - TESTS ON VULCANIZED SPECIMENS: | | | |
| AFTER VULCANIZATION IN PRESS at 170° C. for 10' (ASTM D 412-83) | | | |
| 100% modulus (MPa) | 3.7 | 3.6 | 3.5 |
| Tensile strength (MPa) | 10.6 | 10.0 | 10.5 |
| Elongation at break (%) | 245 | 250 | 256 |
| IRHD (points) (ASTM D 2240-81) | 68 | 68 | 68 |
| AFTER POST-TREATMENT at 250° C. for 24 hours, including 8 h rise (ASTM D 412-83) | | | |
| 100% modulus (MPa) | 5.4 | 5.5 | 5.3 |
| Tensile strength (MPa) | 14.5 | 14.5 | 14.4 |
| Elongation at break (%) | 188 | 200 | 194 |
| IRHD (points) (ASTM D 2240-81) | 69 | 70 | 70 |
| TR TEST (ASTM D 1329) | | | |
| TR 10% | −18.4° C. | −19° C. | −18° C. |
| TR 30% | −14.1° C. | −14.5° C. | −14.1° C. |
| TR 50% | −10.7° C. | −11.5° C. | −10.6° C. |
| COMPRESSION SET (ASTM D 395 method B) 70 h at 0° C., disc (12.5 × 29 mm) | | | |
| reading at 0° C. after 30 sec. | 73% | 73% | 76% |
| reading at 23° C. after 30 min. | 18% | 17% | 20% |
| reading at 23° C. after 28 h | 10% | 9% | 11% |
| 70 h at 23° C.: O-ring D 214 (ASTM 395/B) | | | |
| reading at 23° C. after 30 min. | 20% | 20% | 22% |

From the comparison between the terpolymers according to the present invention (examples 1 and 2) and the one of the art (example 3) it results in particular:

1. that the Tg and TR values of the products according to the present invention are as low as, and often lower than the ones of the known product;
2. as resulting from the data of DH1+DH2 and of DMS, the products according to the present invention exhibit a lower crystallinity;
3. the compression set after compression tests at 0° C. and 23° C. is lower;
4. in spite of a lower tendency to scorch (see the Mooney Scorch data at 135° C.: tΔ15), the vulcanization rate of the terpolymers according to the present invention is higher (see ODR data at 177° C.: $V_{max}$).

EXAMPLES 4-6

It was operated as in Example 1, except that the reactor was brought to pressure by means of the following monomeric mixtures:

| | Ex. 4 | Ex. 5 | Ex. 6 |
|---|---|---|---|
| vinylidene fluoride | 58.5% by mols | 57% by mols | 57.5% by mols |
| hexafluoropropene | 36.5% by mols | 38.5% by mols | 39% by mols |
| tetrafluoroethylene | 5% by mols | 4.5% by mols | 5.5% by mols | and except that, during polymerization, the pressure was maintained constant by feeding the monomers in the following molar ratios:

| | Ex. 4 | Ex. 5 | Ex. 6 |
|---|---|---|---|
| vinylidene fluoride | 76.7% by mols | 77.8% by mols | 78.2% by mols |
| hexafluoropropene | 17.5% by mols | 17.0% by mols | 17.2% by mols |
| tetrafluoroethylene | 5.8% by mols | 5.2% by mols | 4.6% by mols |

There were obtained 2800 g of a terpolymer which, on NMR $^{19}$F analysis, exhibited the following weight composition:

| | Ex. 4 | Ex. 5 | Ex. 6 |
|---|---|---|---|
| vinylidene fluoride | 61% by mols | 62% by mols | 62.5% by mols |
| hexafluoropropene | 32% by mols | 31.5% by mols | 32% by mols |
| tetrafluoroethylene | 7% by mols | 6.5% by mols | 5.5% by mols |

The terpolymer was subjected to the same determinations and tests as the ones of Example 1.
The results are reported in Table 2.

TABLE 2

| Nature of the test | Ex. 4 | Ex. 5 | Ex. 6 |
|---|---|---|---|
| A - DETERMINATIONS ON THE ELASTOMER: | | | |
| Tg midpoint (ASTM D 3418-82) | −25.4° C. | −26° C. | −26.2° C. |
| Tf1 (ASTM D 3418-82) | 44° C. | 48.2° C. | 50.1° C. |
| Tf2 | 72° C. | 58° C. | 63.7° C. |
| DH1 | 0.05 | 0.03 | 0.08 |
| DH2 | 0.05 | 0.09 | 0.10 |
| DH1 + DH2 | 0.10 | 0.12 | 0.18 |
| DMS (METHOD ISO R537B) | | | |
| T α | −19° C. | −19° C. | −19° C. |
| G' (10° C.) | <1 N/mm | 1.0 N/mm | 1.2 N/mm |
| Intrinsic viscosity (ASTM D 1416-83) | 59 ml/g | 60 ml/g | 60 ml/g |
| Mw/Mn (norma ASTM D 3593-80) | 2.4 | 2.6 | 2.5 |
| Mooney viscosity ML (1 + 10') at 121° C. (Mooney unit) (ASTM D 1646-82) | 21 | 20 | 20 |
| B - TESTS ON THE VULCANIZATION MIX: | | | |

TABLE 2-continued

| Nature of the test | Ex. 4 | Ex. 5 | Ex. 6 |
|---|---|---|---|
| MOONEY VISCOSITY OF THE MIX (ASTM D 1646-82) | | | |
| ML (1 + 10') at 121° C. (Mooney unit) | 38 | 37 | 37 |
| MOONEY SCORCH AT 135° C. (ASTM D 1646-82) | | | |
| MV (pounds × inch) | 15 | 14 | 14 |
| t Δ 15 | 48'00" | 46'45" | 47'50" |
| ODR 177° C., ARC ±3° (ASTM D 2084-81) | | | |
| ML (pounds × inch) | 3.7 | 3.5 | 3.5 |
| MH (pounds × inch) | 105 | 100 | 99.8 |
| ts2 (sec) | 173 | 170 | 172 |
| t'90 (sec) | 230 | 236 | 240 |
| $V_{max}$ (pounds × inch/sec) | 2.9 | 3.1 | 3.2 |
| C - TESTS ON VULCANIZED SPECIMENS: | | | |
| After vulcanization in press at 170° C. for 10' (ASTM D 412-83) | | | |
| 100% modulus (MPa) | 3.8 | 3.7 | 3.7 |
| Tensile strength (MPa) | 11 | 10.5 | 10.3 |
| Elongation at break (%) | 260 | 250 | 248 |
| IRHD (points) (ASTM D 2240-81) | 68 | 68 | 68 |
| After post-treatment At 250° C. for 24 hours including 8 h rise (ASTM D 412-83) | | | |
| 100% modulus (MPa) | 5.6 | 5.5 | 5.3 |
| Tensile strength (MPa) | 14.7 | 14.5 | 14.5 |
| Elongation at break (%) | 190 | 188 | 200 |
| IRHD (points) (ASTM D 2240-81) | 70 | 70 | 70 |
| TEST TR (ASTM D 1329) | | | |
| TR 10% | −19.3° C. | −19.4° C. | −19.1° C. |
| TR 30% | −14.8° C. | −15.4° C. | −15.1° C. |
| TR 50% | −12.1° C. | −12.9° C. | −12.8° C. |
| COMPRESSION SET (ASTM D 395 Method B) 70 h at 0° C. disc (12.5 × 29 mm) | | | |
| reading at 0° C. after 30 sec. | 71% | 73% | 74% |
| reading at 23° C. after 30 min. | 16% | 17% | 18% |
| reading at 23° C. after 24 hours | 8% | 9% | 10% |
| 70 h at 23° C.: O ring D214 (ASTM 395/B) | | | |
| reading at 23° C. after 30 min. | 16% | 17% | 20% |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Fluoroelastomers endowed with a $T_g$ equal to or less than about −25° C. and a compression set, after a 70 hour compression test at 0° C. on a disc, according to ASTM D 395 test, method B, equal to or less than about 18% when measured at 23° C. after 30 minutes, comprising the following monomeric composition:

| vinylidene fluoride: | 60.5-64% by weight |
|---|---|
| hexafluoropropene: | 30-33% by weight |
| tetrafluoroethylene: | 5-8% by weight. |

2. Articles manufactured from a fluoroelastomer conforming to claim 1.

* * * * *